Oct. 12, 1965          J. F. FREI ETAL          3,211,051
   OPTICAL MEASURING DEVICE FOR OBTAINING A FIRST DERIVATIVE OF
                   INTENSITY WITH RESPECT TO WAVELENGTH
Filed April 27, 1962                              2 Sheets-Sheet 1

INVENTORS
JAEL F. FREI
EPHRAIM H. FREI
URI P. OPPENHEIM
BY CLAUDE I. COWAN

OSTROLENK, FABER, GERB & SOFFEN

ATTORNEYS

Oct. 12, 1965  J. F. FREI ETAL  3,211,051
OPTICAL MEASURING DEVICE FOR OBTAINING A FIRST DERIVATIVE OF
INTENSITY WITH RESPECT TO WAVELENGTH
Filed April 27, 1962  2 Sheets-Sheet 2

INVENTORS
JAEL F. FREI
EPHRAIM H. FREI
URI P. OPPENHEIM
CLAUDE I. COWAN
BY
OSTROLENK, FABER, GERB & SOFFEN
ATTORNEYS

United States Patent Office 3,211,051
Patented Oct. 12, 1965

3,211,051
OPTICAL MEASURING DEVICE FOR OBTAINING A FIRST DERIVATIVE OF INTENSITY WITH RESPECT TO WAVELENGTH
Jael Fanny Frei and Ephraim Heinrich Frei, both of 5 Rupin St., Rehovoth, Israel; Uri P. Oppenheim, Hachorev St., Haifa, Israel; and Claude I. Cowan, 31 Llanvanor Road, London NW. 2, England
Filed Apr. 27, 1962, Ser. No. 190,562
Claims priority, application Great Britain, May 5, 1961, 16,351/61
1 Claim. (Cl. 88—14)

This invention relates to optical measuring devices of a kind wehrein the intensity of light as transmitted through a medium is measured as a function of another variable such as for example the wavelength of the transmitted light.

This invention is particularly but not exclusively concerned with spectrophotometric measuring devices wherein the transmission of light through a sample is measured as a function of the wavelength of the light and wherein the composition of the sample can be determined by detecting those wavelengths of light which correspond to maximum absoption by the sample, it being understood that different constituents of the sample exhibit maximum absorption of radiation of respectively differing wavelengths.

With such spectrophotometers, in common with other optical measuring devices of the kind to which this invention refers, it is essential to be able to identify clearly the shape of the function refered to above (in case of spectrophotometry, the depedence of absorption on wavelength).

It very often happens however that several maxima of the curve lie very close together and it becomes a matter of great difficulty to distinguish between them.

Thus, in spectrophotometry the sample to be analysed may include components having very similar absorption characteristics, and in consequence the absorption spectra of the sample will show peaks corresponding to very closely spaced wavelengths. In the case where one of the components is present in the sample in relatively minor proportions as compared to the other components, then it becomes a matter of great difficulty if not impossibility to detect the presence of the component present in relatively minor quantities In order to overcome this difficulty in the case of spectrophotometric measurements, it has been proposed, instead of attempting to obtain analytical information from the distribution of the absorption peaks with respect to wavelengths, to derive the first mathematical derivative of the function linking the the absorption with the wavelength and to plot this first derivative against the wavelength. Such measurement techniques have become known as derivative spectrophotometry and it has been found in practice that the derivative curves obtained indicate quite clearly the presence of relatively minor components in the sample to be analysed which would be quite undetectable in the ordinary curves of absorption plotted against wavelengths.

It was initially proposed to obtain the derivative curve by graphically differentiating the conventionally produced curve of absorption plotted against wavelength. It has been found however that such graphical differentiation leads to rather large errors. One major source of such errors is the occurrence of "noise" both in the optical and in the electronic detecting and measuring mechanisms. Such "noise" can for example arise due to inhomogeneity of the sample being studied. It will be clear that when a curve which includes the representation of such noise is differentiated, the curve will include many peaks corresponding to the noise factor and resulting analysis of the differentiated curves is in consequence extremely difficult.

It has been furthermore proposed (French et al. Review of Scientific Instruments, vol. 25 p. 765, 1954) to effect the direct recording of the spectra of the first derivative of absorption with respect to wavelength. French's proposal involves the use of a slit which is arranged to vibrate over a small wavelength interval in the spectral plane so that at successive intervals of time light of wavelengths which differ from each other by small amounts are respectively transmitted through the sample. There can be thus detected at a suitable detector successive intensities of transmitted light which correspond respectively to the absorption of light of the wavelength transmitted at a particular instance. There can therefore be deduced the changes in intensity of the light corresponding to the changes in wavelength, i.e. the derivative of the function linking the absorption and the wavelength.

Considerable practical difficulties are however encountered in the provision of a slit which must vibrate very rapidly within extremely accurate limits. Furthermore, with such a vibrating slit it is not possible to vary both the slit width and the wavelength displacement at the same time.

It is an object of the present invention to provide an optical system for use in an optical measuring device of the kind specified whereby the direct recording of the mathematical derivative of said function can be facilitated.

According to the present invention there is provided an optical system for repetitively transmitting at a high repetition rate at least two successive sections of an optical beam, comprising defining means for defining said sections and associated therewith apertured rotary means adapted to be disposed in the optical path of said beam so that upon rotation, said sections as defined by said defining means are successively allowed to pass.

When such an optical system is used in spectrophotometric measurements the successive sections of the light beam differ from one another by small increments in wavelength and these successive sections are successively and separately passed through the sample to be analysed and the intensity of light emerging from the sample is photoelectrically detected. Electronic measuring means are provided for deriving electronically the difference in intensity corresponding to a particular difference in wavelength. There can thus be obtained a value of the derivative of the intensity of light with respect to wavelengths and these derivatives can be plotted against wavelength. Furthermore, in view of the fact that the successive sections of the beam are repetitively transmitted at a high repetition rate a considerable number of measurements of the derivative will be obtained in a very short time for each particular wavelength of transmitted light. The electronic means refered to above can be arranged to provide a mean value of the derivative thus substantially reducing the dangers of error as a result of random optical or electrical noise.

By high repetition rate is meant at rate of the order of 1000 times/sec. Thus whilst in conventional spectrophotometric analysis a period of several minutes is generally required for the detection of the absorption of light of an entire relevant range of wavelengths, by means of the optical system defined above, a very large number of measurements of the derivative in respect of each particular wavelength can take place without substantially increasing the time necessary for the measurement. This factor is particularly important when it is realized how difficult it is to maintain a light source substantially constant over long periods of time and also in view of the possible difficulty of maintaining certain types of samples in a substantially unvarying condition over relatively lengthly periods of time.

When it is desired to record a first derivative of the function only two adjacent sections of the beam are successively and repetitively transmitted. When however it is desired to record a second derivative, three successive adjacent sections of the beam are transmitted.

Whilst the discussion above has been mainly concerned with the application of an optical system in accordance with the invention to spectrophotometric measurements, the application of the system to other forms of measuring devices of the kind specified is equally possible. One such suitable device is used in connection with schlieren analysis. In the case of such analysis the diffusion of a first substance in a second substance in a cuvette is measured by measuring the variation in the refraction of light passing though the cuvette as a function of the height at which the light passes. In such measurements what is actually measured is the variation of intensity of light on a screen as a function of a length coordinate of the screen. Here again the derivation of the derivative of the light intensity is capable of providing much more accurate results than when the variation of intensity is plotted directly against height. The use of an optical system in accordance with the invention in obtaining such derivatives is particularly advantageous.

Embodiments of the invention will now be described by way of example and with reference to the accompanying drawing in which FIG. 1 is a schematic representation of a spectrophotometer incorporating an optical system in accordance with the invention;

Figure 1:
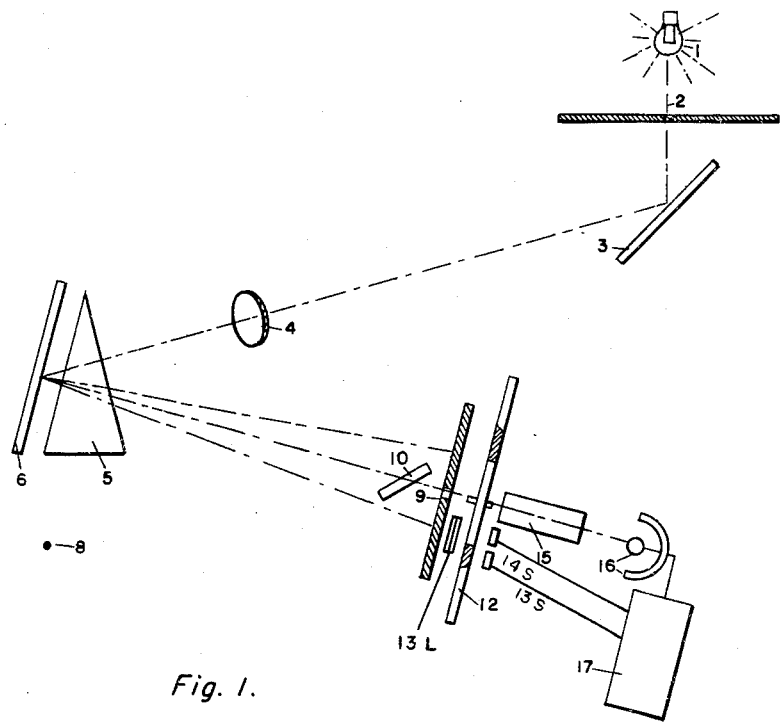
Figure 3:
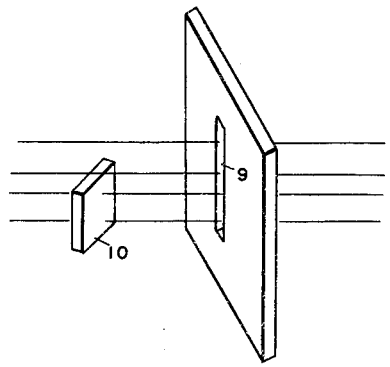
FIG. 3 is a first form of beam section defining means of the optical system.

As seen in FIG. 1 of the drawings, light originating from a light source 1 passes through a collimating slit 2 and is reflected by a mirror 3 through a lens 4 and a refracting prism 5 on to a plane mirror 6. The light reflected from the mirror 6 passes again through the prism 5 wherein it is again refracted and the refracted beam is directed on to a slit 9 disposed in the central position of the beam. Interposed in the optical path of the beam is a quartz plate 10 which is so arranged (as can be seen in FIG. 3 of the drawings) that whilst the upper section of the beam passes directly through the slit 9, the lower section of the beam first of all passes through the quartz plate 10. Thus, passing through the slit 9 will be two adjacent sections of the refracted beam which differ from each other in wavelength by an amount δλ which amount varies in accordance with the spatial disposition of the quartz plate 10.

Light emerging from the slit 9 is incident on a rotatable wheel 12 which is provided with two sets of apertures 13 and 14 the aperture 14 being slightly inwardly displaced with respect to the apertures 13. Thus, upon rotation of the wheel 12 the apertures 13 and 14 pass successively in front of the disc 9 therefore allowing successively the upper and lower sections of the beam passing through the disc 9 to pass through the wheel. Now these upper and lower sections of the beam emerging through the slit 9 differ from one another in wavelength by the amount δλ and therefore at any particular instant of time only a single section of the beam will be allowed to pass through the wheel 12 whilst at successive instances of time successive sections of the beam pass through the wheel 12. These successive sections of the beam which differ from one another in wavelengths are successively passed through a cell 15 in which is located a sample which is to be spectrophotometrically analysed. The light emerging from the cell 15 is detected by a photo cell 16. Thus, at successive instances of time there will be detected at the photocell intensities of radiation which correspond to the irradiation of the cell by wavelengths which differ from one another by the increment δλ. Now the wheel 12 is arranged to rotate at a frequency such that for each particular wavelength being studied a considerable number of successive absorption readings can be obtained, little magnets 13M and 14M are provided on wheel 12 such that the magnets 13M are at the same angular coordinates as the starting edge of the apertures 13 and the magnets 14M are at the starting edge of aperture 14. The magnets 13M and 14M are disposed on different radii on the wheel and small pick up coils 13S and 14S are fixedly disposed near the wheel, such that the magnets 13M will pass near to the coil 13S and the magnets 14M will pass near the coil 14S, electronic means 17 are provided whereby, with conventional gating circuitry on the one hand, the difference of absorption by the sample in respect of the two beam section is derived by taking the output signal of the phototube 16 and mixing it with the signals from the coils 13S and 14S originating synchronously with the signals originating from the light passing through apertures 13 and 14 respectively hence giving the derivatives for a particular wavelength of the function linking absorption and wavelength, and on the other hand the mean value of the derivative in respect of the considerable number of reading thereof for each particular wavelength is calculated.

It is also possible to use instead of the magnets 13M and 14M apertures at the same places and in such a case 13S and 14S signify conventional miniature photo-tubes. In this case a lamp 13L is used to shine light through these apertures on to the photo-cells.

Now in effecting spectrophotometric anlysis of the sample, the prism 5 and the plane mirror 6 are as a unit arranged to rotate about a central axis 8 and as a result of the rotation of this unit light having an entire range of wavelength is arranged to be passed through the sample 15. For each wavelength of incident light a very considerable number of readings of the derivative for that wavelength is obtained.

The use of the quartz plate 10 and slit 9 to produce discrete sections of the beam can be avoided by using defining means such as shown in FIGS. 4 to 7 of the drawings.

Figure 2:
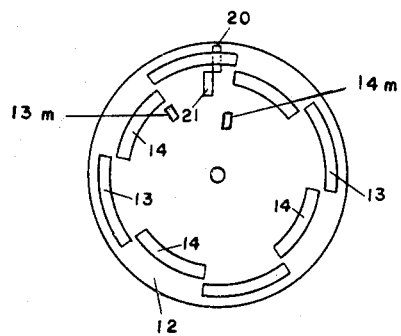
FIG. 2 is a rotary component of the optical system.
Figure 4:
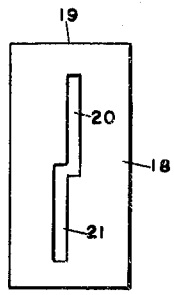

Thus, a screen 18 as shown in FIG. 4, has formed therein a pair of staggered slits 20 and 21 and when this screen is placed in the path of the diffracted beam respectively adjacent sections of the beam pass through the slits 20, 21, these adjacent sections differing from one another in wavelength by δλ. If together with this screen 18 there is associated the wheel described above with reference to FIGS. 1 and 2 of the drawings, then as can be seen in FIG. 2 of the drawing the upper slit 20 will be aligned with the upper set of apertures 13 whilst the lower slit 21 will be aligned with the lower set of apertures 14. In this way and upon rotation of the wheel successive sections of the beams are successively transmitted through the sample 15.

Figure 5:
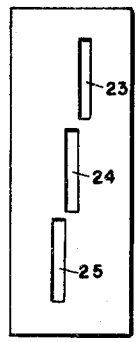
FIGS. 4 to 7 show further form of beam sections defining means for the optical system.

When it is desired to obtain a second derivative of the function linking absorption and wavelength a triple slit arrangement as shown in FIG. 5 can be used. With such an arrangement a wheel having three rows of apertures which are respectively aligned with the three slits 23, 24 and 25 can be employed.

Figure 6:
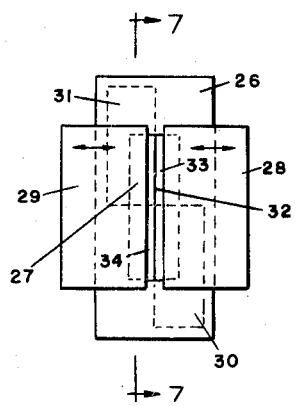
Figure 7:
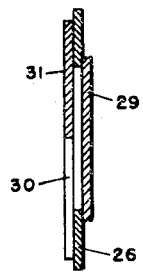

FIGS. 6 and 7 show respectively front elevational and longitudinal sectional views of an arrangement wherein a staggered pair of slits of variable width can be provided. The arrangement comprises a metal plate 26 in which is formed a rectangular opening 27 having a median centre line 32. On either side of the median centre line are fixedly attached plates 30 and 31 which permanently cover opposite quarters of the rectangular opening 27. Two further metal plates 28 and 29 are slidably secured to the plate 26 in such a manner that they can be displaced towards and from the median centre line 32, the arrangement being such that the distance of the edges of the plates 28 and 29 from the median line is always equal. There are thus obtained two slits 33 and 34 whose widths and wavelengths displacement can be readily varied simultaneously.

Whilst the optical system described above has been especially described with reference to spectrophotometric measurements it will be understood that the system can be applied in any case where it is desired to obtain the derivative of the function of the optical variables such as for example in the case of schlieren measurements referred to above.

We claim:

In a system for measuring the derivative of the intensity of light from a sample to be analyzed with respect to wavelength, an optical system for repetitiously transmitting at a high repetition rate at least two sections of an optical beam; a source of a beam of light, light dispersing means in said beam means for defining said sections comprising apertured means disposed in the optical path of said beam, said apertured means comprising a plate having a rectangular opening with a median center line, a pair of fixed and attached plates, one on either side of said median center line for permanently covering opposite quarter sections of said rectangular opening, a further pair of plates secured to slide with respect to said plate and forming therebetween a rectangular opening, said further plates being slideably mounted so that they can be displaced toward and away from said median center line, so that the distance of the edge of said last mentioned further plates from the median is always equal and forms slits having adjustable width and wave length displacements, the construction thus forming a pair of slits whose width and wave length separation vary simultaneously; said slit width defining a light beam whose band width is of the order of 1 angstrom; apertured rotary means positioned in said beam adjacent said means for defining said sections for successively passing upon rotation said sections of said optical beam; said successive sections of light beam differing from each other by small increments of wave lengths, a sample to be analyzed positioned in the path of said section for successively and separately passing said small wavelength increments, means for photoelectrically detecting the light intensity emerging from said sample, electronic means coupled to said photoelectric means for deriving a signal representative of the difference in intensity corresponding to a particular successive difference in wave length, said signal being indicative of the derivative of the intensity of light with respect to said wave length.

References Cited by the Examiner

UNITED STATES PATENTS

| 2,078,768 | 4/37 | Meier | 88—14 |
|---|---|---|---|
| 2,444,560 | 7/48 | Feldt et al. | 88—14 |
| 2,631,489 | 3/53 | Golay | 88—14 |
| 2,648,249 | 8/53 | Canada | 88—14 |
| 2,936,732 | 5/60 | Ring et al. | 88—14 |
| 2,941,443 | 6/60 | McNally | 88—14 |

JEWELL H. PEDERSEN, *Primary Examiner.*